United States Patent
Soini

(10) Patent No.: US 11,861,146 B2
(45) Date of Patent: Jan. 2, 2024

(54) COMPUTER DESKTOP THAT DYNAMICALLY ADAPTS TO A LIVE MULTI-CHANNEL AUDIO STREAM, SUCH AS FOR USE WITH WIRELESS TELECOMMUNICATIONS CUSTOMER SERVICE AGENTS

(71) Applicant: T-Mobile USA, Inc., Bellevue, WA (US)

(72) Inventor: Jonathan Soini, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/880,859

(22) Filed: Aug. 4, 2022

(65) Prior Publication Data

US 2022/0374122 A1    Nov. 24, 2022

Related U.S. Application Data

(62) Division of application No. 16/905,716, filed on Jun. 18, 2020, now Pat. No. 11,442,601.

(51) Int. Cl.
*G06F 3/0484* (2022.01)
*G06Q 30/016* (2023.01)
(Continued)

(52) U.S. Cl.
CPC ............ *G06F 3/0484* (2013.01); *G06F 3/167* (2013.01); *G06F 9/547* (2013.01); *G06F 16/632* (2019.01); *G06N 5/04* (2013.01); *G06Q 30/016* (2013.01); *G10L 15/02* (2013.01); *G10L 15/08* (2013.01); *G10L 15/22* (2013.01); *G10L 15/26* (2013.01); *H04M 3/5133* (2013.01); *H04M 3/5183* (2013.01); *H04S 1/00* (2013.01); *G06F 3/0481* (2013.01); *G06N 20/00* (2019.01); *G10L 2015/088* (2013.01); *H04S 7/30* (2013.01)

(58) Field of Classification Search
CPC ........ G06F 3/0484; G06F 3/167; G06F 9/547; G06F 16/632; G06F 3/0481; G06F 17/00; G06N 5/04; G06N 20/00; G06Q 30/016; G10L 15/02; G10L 15/08; G10L 15/22; G10L 15/26; G10L 2015/088; H04M 3/5133; H04M 3/5183; H04S 1/00; H04S 7/30

See application file for complete search history.

(56) References Cited

U.S. PATENT DOCUMENTS 6,687,877 B1    2/2004    Sastry et al.
7,658,327 B2    2/2010    Tuchman et al.
(Continued)

*Primary Examiner* — Quoc A Tran
(74) *Attorney, Agent, or Firm* — Perkins Coie LLP

(57) ABSTRACT

The disclosed technology includes at least one method performed by a system to dynamically adapt a computer desktop of a customer service agent to a live audio dialogue. The system can cause a speech feature analyzer to process a segment of the live audio dialogue to output multiple speech features and obtain search results by querying a database for the multiple speech features. The method can further include generating control signals based on the search results and cause an API to configure the computer desktop based on the control signals. The system can dynamically adapt the computer desktop in accordance with additional control signals that are generated based on next segments of the live audio dialogue.

20 Claims, 7 Drawing Sheets

(51) Int. Cl.

| | | |
|---|---|---|
| G06F 16/632 | (2019.01) |
| G06N 5/04 | (2023.01) |
| G06F 9/54 | (2006.01) |
| G10L 15/02 | (2006.01) |
| G10L 15/26 | (2006.01) |
| G10L 15/22 | (2006.01) |
| H04S 1/00 | (2006.01) |
| H04M 3/51 | (2006.01) |
| G06F 3/16 | (2006.01) |
| G10L 15/08 | (2006.01) |
| G06N 20/00 | (2019.01) |
| G06F 3/0481 | (2022.01) |
| H04S 7/00 | (2006.01) |
| G06F 17/00 | (2019.01) |

(56) References Cited

U.S. PATENT DOCUMENTS

| | | |
|---|---|---|
| 7,769,160 B1 | 8/2010 | Cordell et al. |
| 8,370,155 B2 | 2/2013 | Byrd et al. |
| 8,462,934 B1 | 6/2013 | Cordell et al. |
| 8,699,693 B1 | 4/2014 | Cordell et al. |
| 8,995,645 B1 | 3/2015 | Cordell et al. |
| 9,536,527 B1 * | 1/2017 | Carlson .............. H04L 43/14 |
| 9,699,312 B2 | 7/2017 | Kuhn et al. |
| 9,986,090 B1 | 5/2018 | Eades |
| 10,367,939 B2 | 7/2019 | Eades |
| 2001/0054064 A1 | 12/2001 | Kannan |
| 2002/0032809 A1 | 3/2002 | Bateman et al. |
| 2002/0035474 A1 | 3/2002 | Alpdemir |
| 2002/0140741 A1 | 10/2002 | Felkey et al. |
| 2003/0018702 A1 | 1/2003 | Broughton et al. |
| 2003/0208754 A1 | 11/2003 | Sridhar et al. |
| 2004/0057569 A1 | 3/2004 | Busey et al. |
| 2004/0059841 A1 | 3/2004 | Bateman et al. |
| 2004/0141508 A1 | 7/2004 | Schoeneberger et al. |
| 2005/0177525 A1 | 8/2005 | Apple et al. |
| 2006/0156251 A1 | 7/2006 | Suhail et al. |
| 2008/0192908 A1 | 8/2008 | Okeefe et al. |
| 2008/0240405 A1 | 10/2008 | Conway et al. |
| 2010/0114822 A1 | 5/2010 | Pollock |
| 2010/0228776 A1 | 9/2010 | Melkote et al. |
| 2010/0274618 A1 | 10/2010 | Byrd et al. |
| 2012/0076283 A1 | 3/2012 | Ajmera et al. |
| 2015/0131792 A1 | 5/2015 | Kuhn et al. |
| 2018/0349917 A1 | 12/2018 | Gaedcke et al. |
| 2018/0352086 A1 | 12/2018 | Eades |
| 2022/0084520 A1 * | 3/2022 | White ................ B25F 5/00 |

* cited by examiner

Search | | Dynamic Desktop 500-B | | | — ☐ ✕
--- | --- | --- | --- | --- | ---

Jonathan
All Timestamps in PST

| TAB 502-1 | TAB 502-4 ✕ | TAB 502-2 ✕ | TAB 502-6 ✕ |

Summary | Device | Network | Account | Journey

DEVICE
Caution
Minor Impacts

NETWORK
Can expect 4GLTE in most big buildings and homes.

ACCOUNT
All good!

TEST UAT ACCOUNT (tetessssssaga)
(206) 555-4783
Call Back @ (206) 555-4783
Dropped Call T-Mobile App
Personal Guarantee Installed Applications Issues Found
Device Not in Warranty
OS Version is Unknown
Rest is good ✓ All good ✓ All good Customer | Memo | Complaint | Messenger | Tools ▶ Customer Billing Address: 11111 111ⁿᵈ Ave Bellevue WA 98006

⚙ THE FIX

● Select Category ───── ○ Verify Problem ───── ○ Find Fix Flows ───── ○ Troubleshoot ───── ○ Resolution Search for topics, eg: Slow Internet    🔍 SEARCH Type: Post Paid (Active)
Account Role: Regular-Individual
BAN: Child Line
DIGITS: 962967043
0 DIGIT LINES Recent

| Data | Signal & Voice | Signal & Voice | Messaging | Hardware | Services and Feature |

Samsun - Galaxy S5
Tech: L1900 II, L2100 IV,... more
IMEI in use: 000001069527792
Device Features Simulator
SIM#: 8900000002770369171

ISSUE CENTER | All times are in Pacitific Daylight Time

Issue Center

COMPUTER DESKTOP THAT DYNAMICALLY ADAPTS TO A LIVE MULTI-CHANNEL AUDIO STREAM, SUCH AS FOR USE WITH WIRELESS TELECOMMUNICATIONS CUSTOMER SERVICE AGENTS

CROSS-REFERENCE TO RELATED APPLICATION

This application is a division of U.S. patent application Ser. No. 16/905,716, filed Jun. 18, 2020, entitled COMPUTER DESKTOP THAT DYNAMICALLY ADAPTS TO A LIVE MULTI-CHANNEL AUDIO STREAM, SUCH AS FOR USE WITH WIRELESS TELECOMMUNICATIONS CUSTOMER SERVICE AGENTS, which is hereby incorporated by reference in its entirety.

BACKGROUND

A contact center is a central point from which customer contacts are managed. For example, FIG. 1 is a system diagram 100 that illustrates a contact center 102 operated by a company to administer incoming product or service support or information inquiries from customers. A customer 104 can use her phone 106 to call the contact center 102 over a telecommunications network 108. Other modes of communications such as instant messaging or e-mail can occur over a computer network 110.

An initial contact with the contact center 102 can begin with an interactive voice response (IVR) interaction to accept voice inputs via a speech recognition system or DTMF (dual tone multi frequency) tones via a telephone keypad. An IVR system can respond with pre-recorded or dynamically generated audio and direct the customer 104 to a human customer service agent 112 ("agent 112") that is trained to address customer inquiries. The agent 112's work station includes a phone 114 (shown as a headset) to receive calls, a computer 116, and a display device 118. The computer 116 is connected over the computer network 110 to a solutions database 120 and/or the web to search for information that can assist the agent 112 in addressing the customer 104's inquiry. The display device 118 displays search results.

A dialogue between the customer 104 and the agent 112 usually starts with the customer 104 describing a problem and asking for a solution. Oftentimes, the problem description is incomplete such that the agent 112 must continue interacting with the customer 104 to further clarify the issue. The agent 112 then manually searches the solution database 120 to find a relevant solution and may manually search the web. This can include subjectively selecting keywords and then submitting a query for those keywords through a search engine. The agent 112 then clicks on one or more of the links found by the search engine and checks to see if the document contains a relevant solution. This often takes place while the agent 112 is trying to maintain the conversation with the customer 104.

The time taken to search can have a negative impact on the interaction because the agent 112's attention is not focused on the dialogue, effective searching is difficult, and search results are inconsistent among agents. Even a few seconds that avoid distractions can have a significant benefit, both in terms of the agent 112's productivity and in the customer 104's satisfaction, which can impact whether the customer 104 will do business with the company in the future.

BRIEF DESCRIPTION OF THE DRAWINGS

Embodiments of the present technology will be described and explained through the use of the accompanying drawings.

FIG. 5A illustrates a screen view of a dynamic computer desktop for a customer service agent.

FIG. 5B illustrates another screen view of a dynamic computer desktop for a customer service agent.

Figure 1:
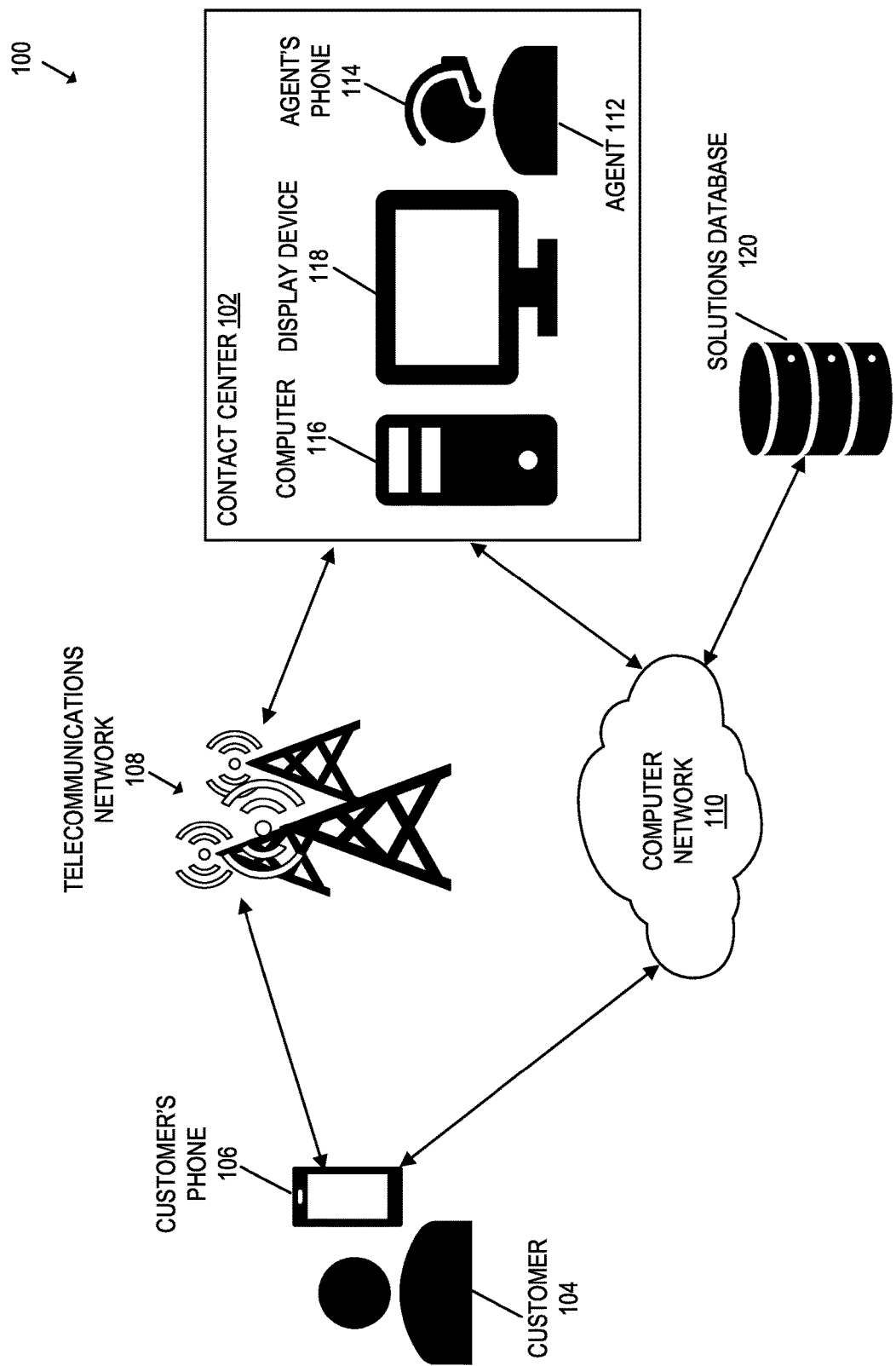
FIG. 1 is a system diagram that includes a contact center operated by a company to administer support or information for inquiries from customers.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The disclosed technology relates to a system that can actively adapt the content and layout of a computer desktop based on a live multi-channel audio stream. The content and arrangement of the content of the desktop can change to track the audio stream. In one example, the live multi-channel audio stream is a live two-channel voice conversation over a telecommunications network between a customer and a customer service agent ("agent") of a company. The company can be a network carrier and the customer of the network carrier can be calling to speak about product or service support or information inquiries. The agent has a work station at a contact center and operates a computer that presents the desktop on a display device to aid the agent in addressing the customer's inquiries. The desktop can include graphical controls in a layout with links to resources of information that are relevant to the conversation with the customer. As such, the desktop is a portal to resources that the agent can use to address the customer's inquiries. Unlike conventional systems, the disclosed system can dynamically adapt the desktop automatically based on the spontaneous dialogue during the live audio call.

A system includes backend and frontend components. A backend search system monitors a live two-channel audio dialogue between, for example, a customer and an agent at a contact center. The backend system performs natural language analysis on the dialogue to extract keywords or other speech features (e.g., indication of a problem) useful for querying a solutions database. The backend search system dynamically adapts the desktop to the current speech features of the conversation, to provide the agent with timely and relevant talking points and answers. Thus, the agent accesses the company's resources through the desktop while engaging in the spontaneous dialogue with the customer. Accordingly, the agent's judgement remains integral to engaging with the customer in a natural way while being more effective and consistent at addressing customer inquiries. The backend speech feature generator can be specifically trained for a contact center of a network carrier, and a search engine can weigh the speech features differentially. For example, customer speech features can bias a search more than agent speech features. The system then generates control signals based on search results to dynamically adapt the agent's desktop to the latest live dialogue so that information most likely to be useful to the agent in solving the customer's issues is presented.

In some implementations, the backend search system can include a real-time sentiment tracker that detects a probability of a feeling or emotion expressed by the customer based on certain speech features (e.g., tone, speed, volume) of the live call. A measure of the customer's sentiment can bias the search for results relevant to the content of the dialogue and the customer's sentiment. In some implementations, the backend search system includes a memo function that automatically transcribes and stores at least a portion of the live dialogue. That is, the dialogue is converted from speech-to-text and stored for future use. For example, the transcribed speech can be used to generate feedback signals that train a machine learning model of the search engine, which can improve the probability of identifying relevant information, though any personally identifiable information related to the customer is not stored.

The frontend includes the agent-facing desktop. The frontend can plug into the backend search system to obtain resources relevant to the live call. Hence, the system can dynamically adapt the desktop to showcase resources that are timely to customer inquiries as they arise or develop during the live call. In addition to content (e.g., device specifications, service terms, customer history), the resources can include software tools. The structure of the desktop can also change automatically based on other inputs including inputs by the agent to the desktop and customer alerts.

In one implementation, the dynamic desktop has a browser-like interface that includes ordered tabs with associated windows that include different resources. For example, a customer that initially calls a contact center may engage an IVR system. The customer's responses can include background or context that can be used to initially structure the tabs of the desktop, including the number of tabs, their order, and content. The windows of tabs with more relevant content are placed toward the front. The order, structure, and content can adapt to the spontaneous dialogue of the live call. For example, the desktop can automatically launch relevant software tools, notifications, or pages based on key data points obtained before a live call with the agent and then change to adapt as the live call continues. Examples of the key data points include a statistical characteristic of the customer (e.g., frequency of incoming calls), a historical characteristic of the customer (e.g., customer loyalty), an indication of the customer's device, and an indication of a service plan subscribed to by the customer. The desktop can also adapt to an agent's role or business unit and offer search capabilities biased by key data points. Further, the system can track multiple sessions and searches as part of a machine learning process to improve the performance of the system to dynamically adapt the desktop with the most suitable content at the most suitable time.

As a result, agents spend less time looking for content or tools that they would otherwise search for manually. Further, the desktop can control the amount of tools or content that are presented to the user to avoid the routine mistake of manually opening too many tabs or content that would otherwise require the agent to navigate through a crowded desktop. The agents can be more efficient on calls by feeding the agent the content and tools rather than needing the agent to search through information. Accordingly, the dynamic desktop provides an experience or platform that ties together the agent's collection of resources into one cohesive experience.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

The term "live," in the context of computer desktop that adapts to a live audio stream of a telephone conversation, refers to adapting the computer desktop based on an ongoing audio dialogue. As such, the audio dialogue is created, communicated, processed, and used to adapt the computer desktop without perceptible latency or delay to the agent viewing the computer desktop, which is oftentimes referred to as occurring in "real-time" or "near-real time," or with a tolerable delay where the desktop adapts to include resources that are useful to the agent during the conversation because the resources are based on a recent segment of the telephone conversation that continues changing.

The term "computer desktop," "desktop," "computer data display" can refer to the working area of a computer display regarded as a representation of a notional desktop and containing icons or graphical controls that represent items such as files. As used here, a desktop can include a user interface (UI) or windows that provide working areas for an agent. For example, a computer desktop can be embodied like a web browser with portions that contain certain content and that organizes content into different tabs. A "dynamic desktop" or simply "desktop" can be used interchangeably in this description when referring to a desktop that can dynamically adapt to an ongoing multi-channel speech audio signal as it spontaneously develops.

Figure 2:
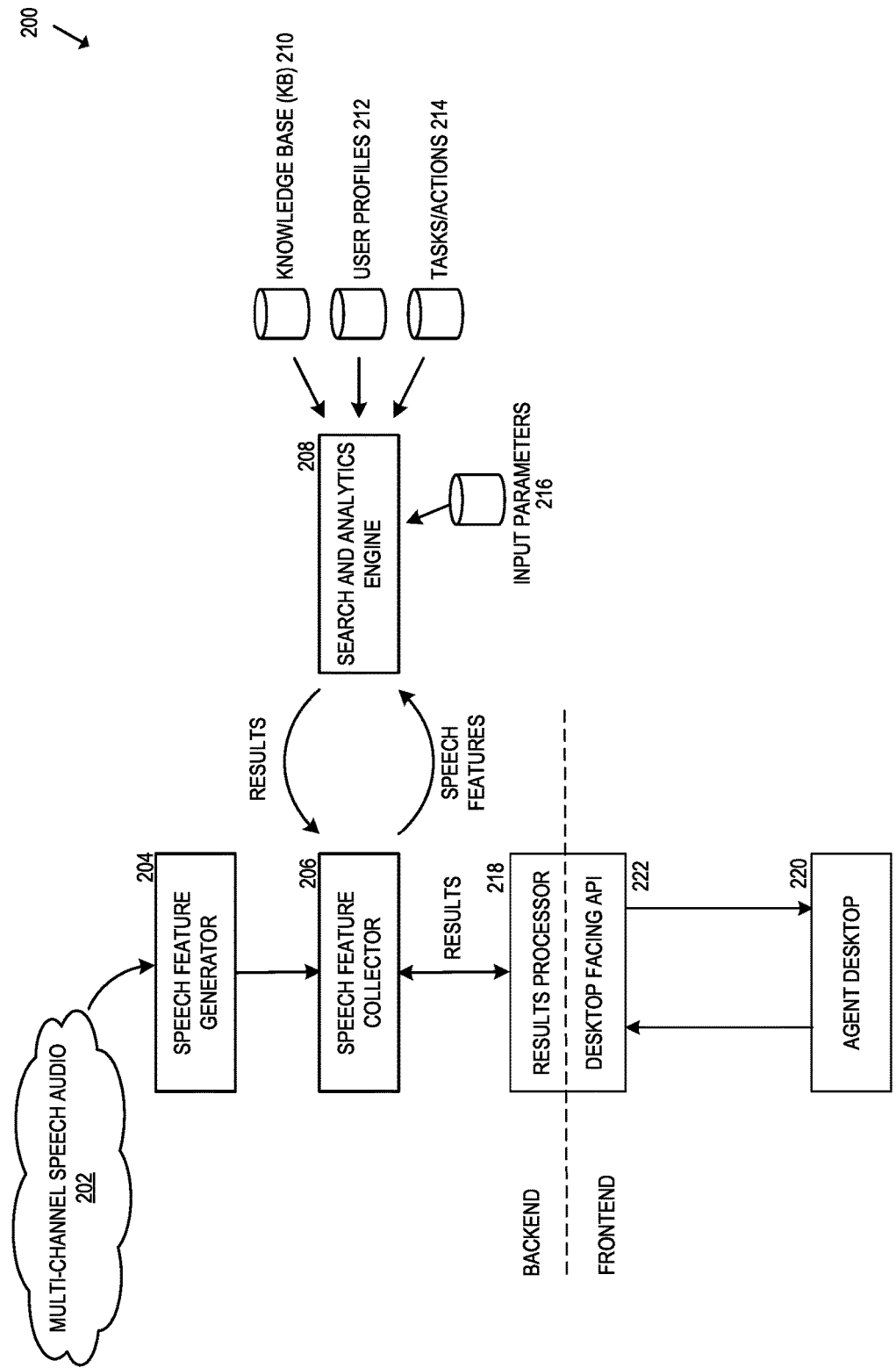
FIG. 2 is a block diagram that illustrates a system for dynamically adapting a computer desktop based on a live audio communication between a customer and customer service agent.

FIG. 2 is a block diagram that illustrates a system that can dynamically adapt an agent's desktop based on a live audio conversation with a customer. The system 200 includes backend components to automate searches and frontend components to configure the agent's desktop. The components can include a combination of hardware and/or software at a common location or distributed and administered by different entities.

As shown, multi-channel speech audio 202 is fed into a speech feature generator 204. Multiple speech audio channels can be logically divided into separate individual audio streams. For example, a live two-way call between a customer and agent can be streamed to the speech feature generator 204 as two-channel speech: a first channel includes customer speech and a second channel includes agent speech. Likewise, a three-way call can be fed to the speech feature generator 204 in a separate channel for each of the three participants. In some embodiments, a channel includes a separate physical transmission medium of an audio connection for each participant of a call.

The speech feature generator 204 converts analog speech signals of the one or more channels into digital speech audio information that can be processed to create or extract speech features. As such, the speech feature generator 204 enables recognition and translation of spoken language into features of speech such as words, phrases, patterns, tone, amplitude, etc. For example, the speech feature generator 204 can include an automatic speech recognition (ASR) function or speech-to-text (STT) function that transcribes speech into text.

In some embodiments, the speech feature generator 204 can implement a machine learning process to train a feature model that outputs speech features based on a training set of text and vocabulary for a particular type of contact center. For example, in the context of a telecommunications contact center, the training set can include text and vocabulary that is specific to telecommunications services, products, or information. As such, the speech feature generator 204 can analyze human voices of prior calls received by similar contact centers to fine-tune the feature model implemented by the speech feature generator 204.

In some embodiments, the speech feature generator 204 can label the search features based on the content and/or source of the speech to facilitate subsequent processing. For example, the labeled speech features of a customer can be weighted more than agent speech features, when training a search model or when searching for relevant information that addresses a customer's inquiry. Moreover, the speech feature generator 204 can be trained to process the customer audio channel to be speaker-independent and trained to process an agent audio channel to be speaker-dependent. As a result, the speech feature generator 204 can find relevant information for any customer inquiry but is customized for a particular agent.

A speech feature collector 206 can receive the output of the speech feature generator 204, which includes speech features of the multi-channel speech audio 202. In some implementations, the speech feature generator 204 can be a third-party service such as GOOGLE voice-to-text or AMAZON transcribe, which can transcribe customer service calls and generate metadata to create a searchable archive of speech features that are fed to the speech feature collector 206. In the context of a telecommunications call center, the collected speech features can include keywords or phrases related to a communications service, mobile phone device problems, device specifications, service terms, customer history, etc.

The speech features of the speech feature collector 206 are fed to a search and analytics engine 208 in a query for search results. For example, the speech features of a live audio call between a customer and agent can be fed to the search and analytics engine 208 while the audio call is ongoing in real-time or near-real time. Examples of sources of search results include databases for knowledge base (KB) articles 210, user profiles 212, and tasks or actions 214. Among other things, the KB articles 210 database can store complex structured and unstructured information used by the contact center. The user profiles 212 database can store specific data of particular customers including service plans, mobile device specification, preferences, and customer business histories. The user profile 212 can also include data about agents including their expertise and work history or experience, and associated business unit. The tasks or action 214 database can include tasks or actions that can be taken by the agent or customer to address an inquiry.

The search and analytics engine 208 can search for and identify search results including items in the databases that match speech features (e.g., phrases, keywords, characters) or labels that were extracted or created based on the live conversation between the agent and customer. The search engine can include a learning algorithm that finds patterns in training data indicative of input parameters corresponding to target results. The output of the training process is a machine learning search model that can predict search results. In one implementation, the input parameters 216 can include feedback obtained from inputs by the agent to the agent's desktop. Examples of the input parameters include clicks or other interactions on the agent's desktop in response to search results, events that occurred on the agent's desktop, results that were selected or utilized to address a customer's inquiry, or any other analytic process or operation.

The results output by the search and analytics engine 208 are sent to the speech feature collector 206. Hence, a cycle of speech features and returning results from the search and analytics engine 208 can occur periodically during a live audio call between a customer and agent. For example, the speech features can be fed to the search and analytics engine 208 and return results every 0.01, 0.2, or 3 seconds. In some implementations, the cycle of inputting speech features and outputting results by the search and analytics engine 208 is continuous while the live conversation is ongoing.

A results processor 218 manages the results generated by the search and analytics engine 208 to deliver suitable content or tools to the agent's desktop. For example, the results processor 218 can include a table that maps results such as content, tools, or other features to locations of the dynamic desktop, which is being viewed by the agent during the live call with the customer. In some implementations, the results process 218 creates control signals based on the search results. The control signals can control how the system can dynamically adapt the agent desktop 220.

The agent desktop 220 can be structured based on a new live call and dynamically adapt to the live call as it spontaneously develops. For example, a new call that is received at the agent's telephone can cause the agent's desktop to establish a communications socket with the results processor 218 to stream results by calling functions of a desktop facing application programing interface (API) 222. The agent desktop 220 can also use the communications socket to provide feedback of input parameters to the search and analytics engine 208 through the results processor 218 and/or the speech feature collector 206.

In some implementations, the resources that are available to the agent desktop 220 can be further filtered base on whether they are associated with a measure that exceeds a predetermined threshold. For example, the results can be associated with relevancy scores and the agent desktop 220 may only show content that has a relevancy score greater than a threshold (e.g., 95) and only launch tools that have a relevancy score that is greater than another threshold (e.g., 80). The content and tools that do not exceed their respective thresholds can be queued and readily available but not shown or launched, respectively. As such, the agent desktop 220 can avoid being crowded by relevant content or tools.

Figure 3:
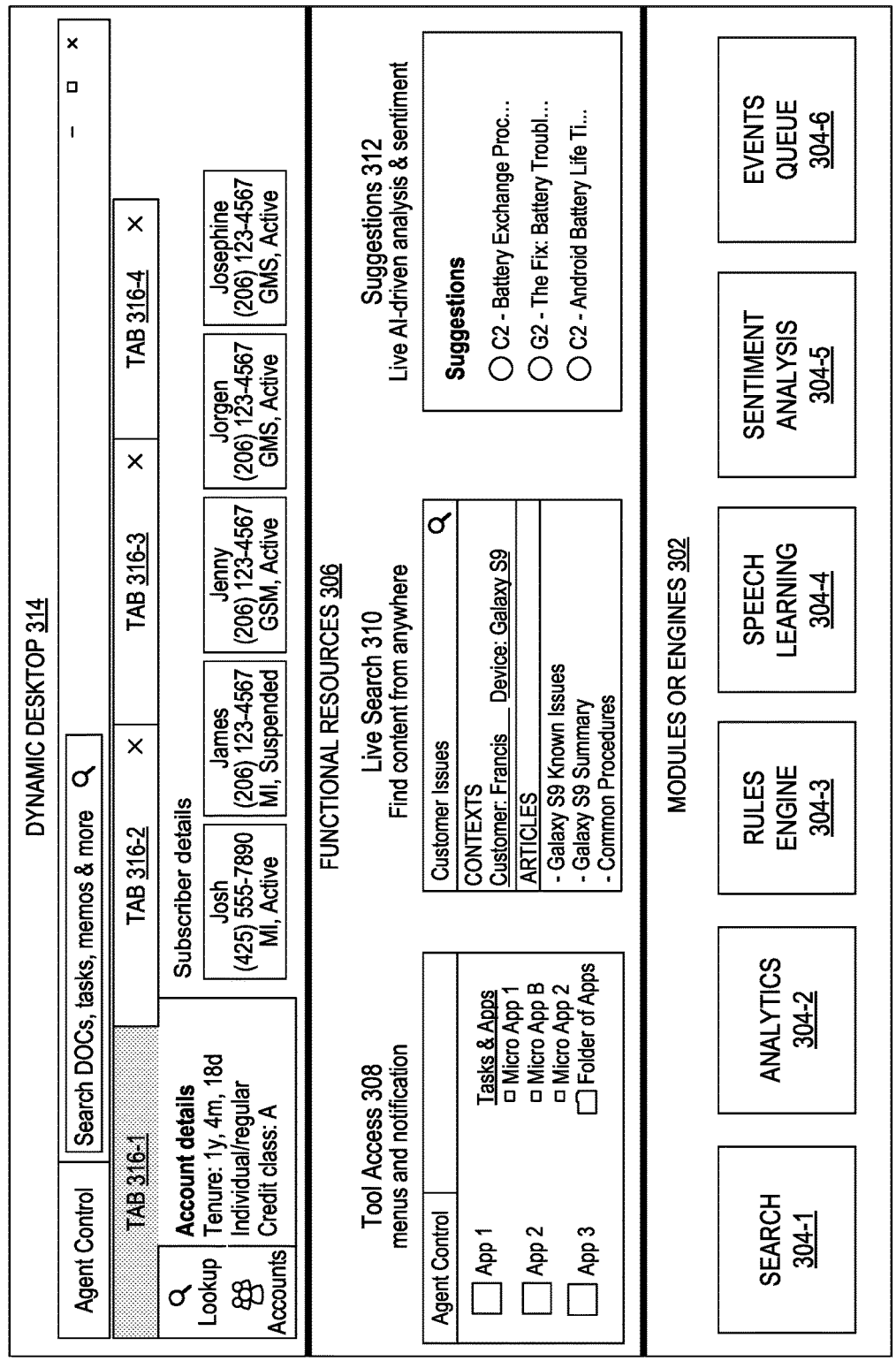
FIG. 3 is a block diagram that illustrates a platform that supports a computer desktop for a customer service agent.

FIG. 3 is a block diagram that illustrates a platform 300 implemented by a system to dynamically adapt a dynamic desktop (also referred to as a "dynamic desktop") for a customer service agent. As shown, the platform 300 has a lowermost layer of functional modules or engines 302 that includes a search module 304-1, an analytics module 304-2, a rules engine 304-3, a live speech learning module 304-4, a sentiment analysis module 304-5, and an events queue 304-6. The modules or engines 302 can be implemented with any combination of software (e.g., executable instructions, or computer code) and hardware (e.g., at least a memory and processor). Accordingly, in some examples, a module or engine is a processor-implemented module or set of code and represents a computing device having a processor that is at least temporarily configured and/or programmed by executable instructions stored in memory to perform one or more of the particular functions that are described herein.

The search module 304-1 can be embodied as a search engine that searches for and identifies items in a database that correspond to keywords or characters indicated by a user during an ongoing dialogue. The analytics module 304-2 can be embodied as an engine that processes inputs (e.g., speech, computer interactions) and outputs the discovery, interpretation, and communication of meaningful patterns. It can also entail applying data patterns towards effective decision making. In other words, the analytics module 304-2 can be understood as the connection between data and effective decision making. The rules engine 304-3 performs logic-based determinations regarding how to adapt a dynamic desktop, the content items, software tools, notifications, and their placement on the dynamic desktop. For example, the rules engine 304-3 can determine whether the relevance of content items or software tools are shown or launched, respectively, on the dynamic desktop depending on whether their relevance exceeds one or more thresholds. The speech learning module 304-4 implements a learning algorithm to improve the speech learning capability of the platform 300. The sentiment analysis module 304-5 can similarly implement a learning algorithm to improve the sentiment analysis of the platform 300. The events queue 304-6 performs a queueing function for events that are identified in the audio stream, which can be used to adapt the dynamic desktop.

The functional resources 306 rely on the modules or engines 302 to perform functions including tool access 308, live search 310, and suggestions 312. Examples of the tool access 308 include menus, notification, and apps that can be launched or embedded on a dynamic desktop to adapt to a live audio conversation between a customer and an agent. Hence, the tool access 308 can rely on the speech learning module 304-4, sentiment analysis module 304-5, and other modules or engines to identify suitable tools. Likewise, the live search 310 can find content from a variety of databases and the suggestions 312 can find suggestions responsive to the live audio dialog between the customer and agent.

The uppermost layer of the platform 300 represents the dynamic desktop 314 that is presented on the agent's computer. The dynamic desktop 314 is embodied like a web browser with portions that contain certain content and that organizes content into different tabs. That is, the dynamic desktop 314 includes multiple tabs and associated display areas (e.g., windows) that are ordered such that any content items of the frontmost window are more relevant to the most recently analyzed portion of the audio conversation compared to any content items of remaining windows hidden behind the frontmost window. As shown, the dynamic desktop 314 includes tabs 316-1 through 316-4, wherein tab 316-1 is the frontmost tab that displays its content items while the content items of the windows associated with tabs 316-2 through 316-4 can include content items of progressively less relevance. Hence, the tab 316-4 contains the least relevant content among all the tabs 316-1 through 316-4.

Figure 4:
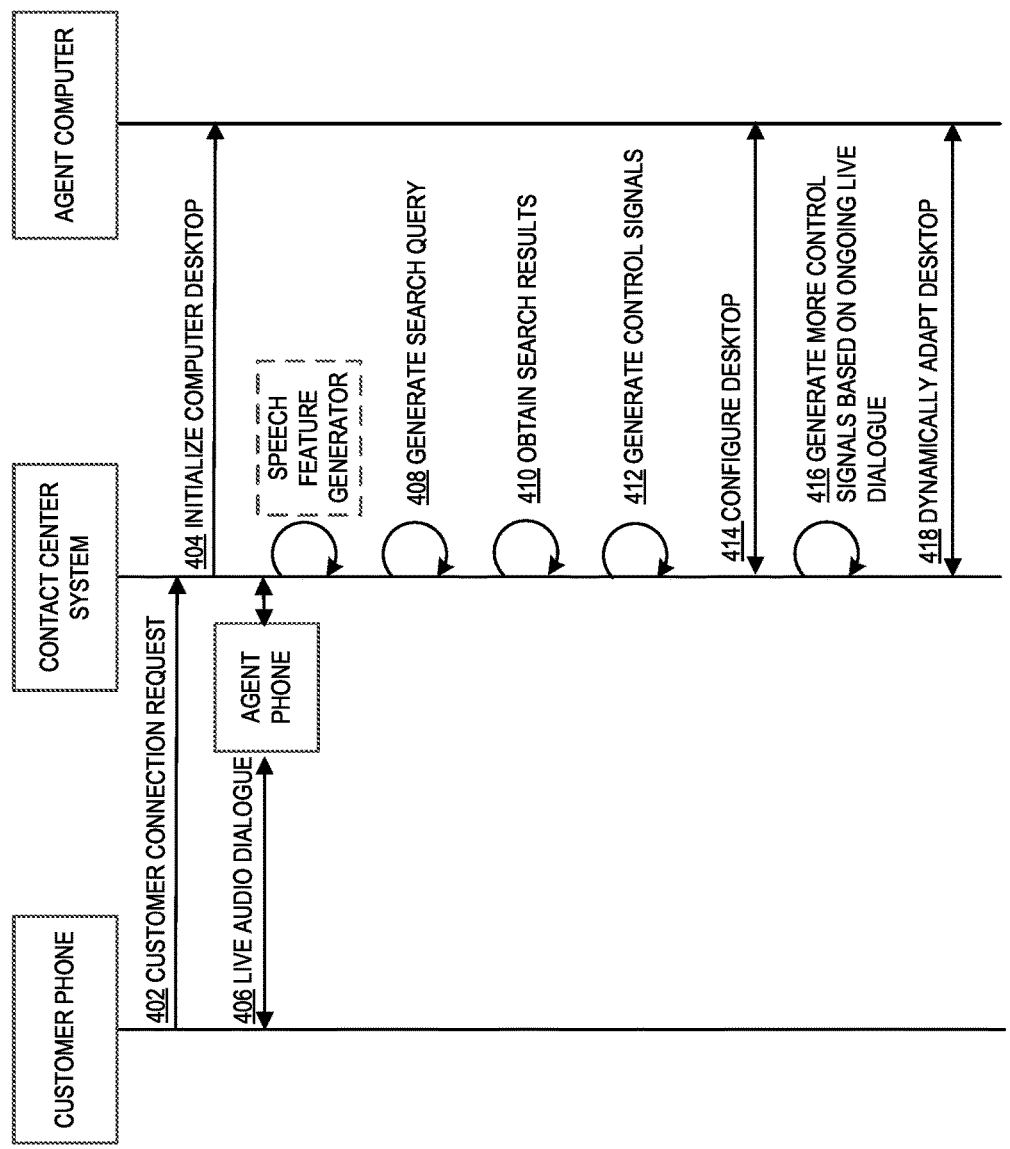
FIG. 4 is a flow diagram that illustrates a process for dynamically adapting a computer desktop for a customer service agent.

FIG. 4 is a flow diagram that illustrates a process for dynamically adapting a computer desktop ("desktop" or "dynamic desktop") for a customer service agent to a live audio dialogue with a customer. The process 400 can be performed by a contact center system ("system") to dynamically adapt any user interface (UI) in real-time based on a live audio dialogue.

In 402, the system receives a customer-initiated connection request for a contact center. The connection request can include an indication of an inquiry from a customer. For example, when calling the system, the customer can provide preliminary inputs to an interactive voice response (IVR) system. The system can collect contextual or other information about the customer from a customer and/or retrieved from a customer database. The system can generate a relevancy measure based on the preliminary inputs.

In 404, the system initializes a desktop for a computer of the agent of the contact center based on the relevancy measure. In particular, the system causes display of the desktop on a computer in which the agent is logged-in.

In 406, the system establishes an audio connection (e.g., live telephone call) between the customer and the agent. In one example, a two-channel audio connection for a live audio dialogue includes a first channel for customer speech and a second channel for agent speech. A speech feature analyzer (e.g., natural language analyzer) can process segments of the live audio dialogue in accordance with a speech feature model to output speech features such as keywords. In one example, speech features can indicate substance and meaning of the segment of the live audio dialogue. In some implementations, a third-party service provider provides the speech feature analyzer.

In 408, the system generates a search query based on the search features (e.g., keywords). In one example, the system can predict a customer's inquiry of the live audio dialogue based on the multiple keywords, create a search term that is indicative of the inquiry, and add the search term to the search query. In some implementations, the search features can be labeled for the search query. For example, the system can label search features as telecommunications terms that are weighted more than a search feature that is not labeled as a telecommunications term. As such, the search query (and results) are biased for telecommunications terms. In another example, the search features are labeled as either customer speech or agent speech. The customer speech can be weighted more than agent speech. As such, the search query (and results) is biased for customer speech. In some implementations, the output of the speech feature analyzer includes an indication of the customer's sentiment, which can be used to bias the search query and as a feedback signal to improve the performance of the search feature analyzer.

In 410, the system obtains search results by querying one or more databases with the search query. The search results can include content items that are each relevant to the substance and meaning of the live audio dialogue. In addition (or alternative) to the content items, the search results can include a software tool, software application, or notification that is relevant to the live audio dialogue. In some implementations, the search results are weighted based on demographic and historical information about the customer and real-time actions performed by the agent on the desktop while engaged in the audio dialogue with the customer.

In some implementations, the search results are ranked based on a statistical or historical characteristic of the customer, an indication of a customer device, or service plan subscribed to by the customer. The system can cause display on the desktop of any of the multiple content items that exceed a first threshold and cause any of the multiple software tools that exceed a second threshold to launch on the desktop. In one example, the search results are weighted based on a consumer alert associated with the customer's mobile phone, where a type or model of the customer's mobile phone was indicated in the keywords.

In 412 the system generates one or more control signals based on the search results. The control signals are configured to control the content and placement of the content (or other resources) on the dynamic desktop during the live audio dialogue. For example, the control signals can cause the desktop to display only content items with a relevancy score that exceeds a threshold.

In 414, the system causes an application programming interface (API) to configure the desktop during the live audio dialogue based on the one or more control signals. In one example, the desktop includes multiple tabs and associated windows that are ordered such that any content items of the frontmost window are more relevant to the segment of the live audio dialogue compared to any content items of any other tabs.

Figure 5A:
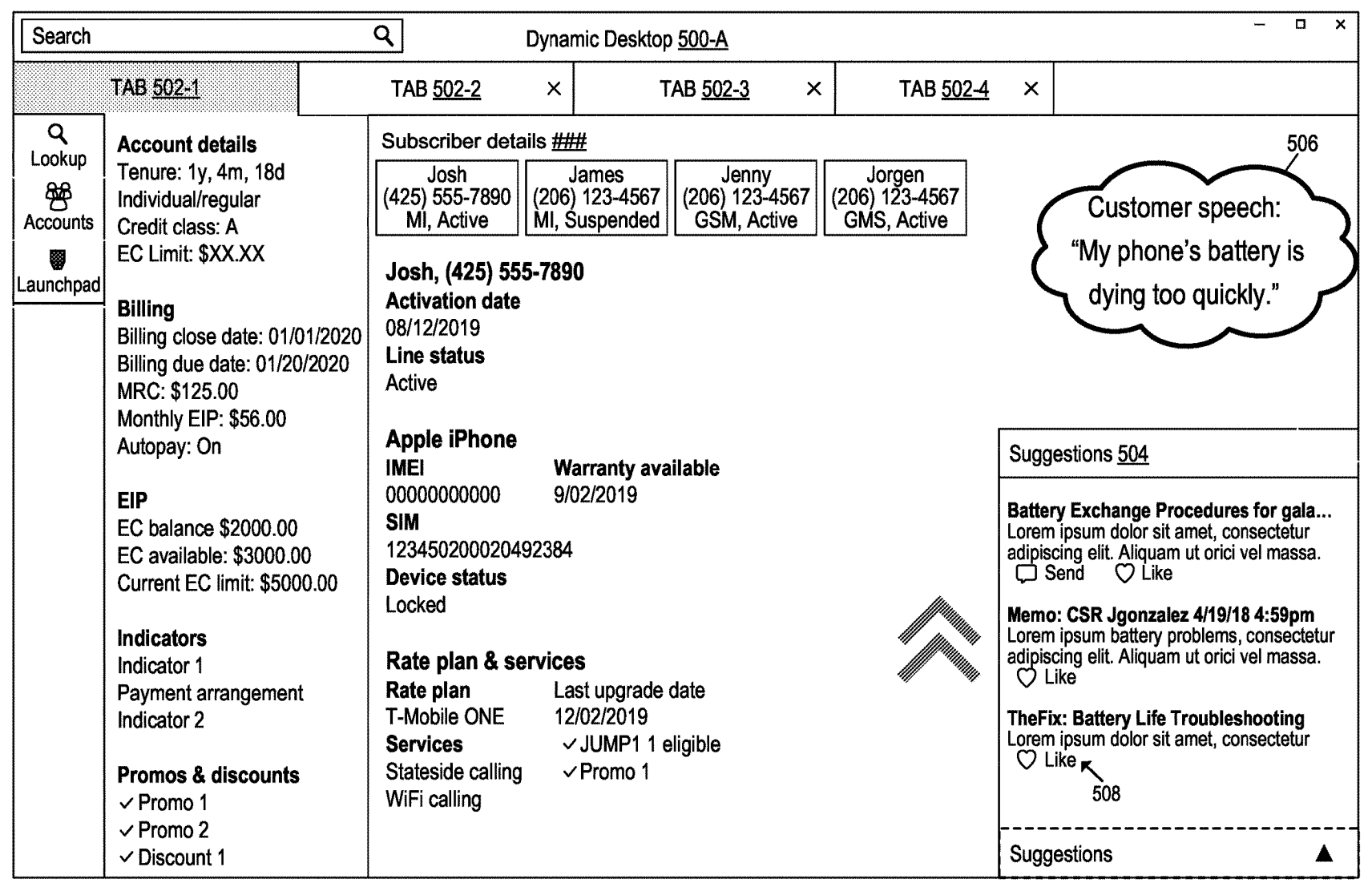

For example, FIG. 5A illustrates a screen view of a dynamic desktop 500-A for a customer service agent. As shown, the dynamic desktop 500-A includes four tabs 502-1 through 502-4 with content items in each respective window area. For example, the frontmost tab 502-1 has content items including "account details," "billing," etc. The content items of the window associated with tab 502-2 are hidden behind the content items of the tab 502-1. The content items of the window associated with tab 502-3 are hidden behind the content items of the tab 502-2, and the content items of the window associated with tab 502-4 are hidden behind the content items of the tab 502-3. The tabs 502-1 through 502-4 can be ordered in accordance with the relevance of their content items. For example, the frontmost tab 502-1 includes the most relevant content items while the backmost tab 502-4 contains the least relevant content items.

The dynamic desktop 500-1 displays a suggestions window 504, of a software tool, that overlays the window of the frontmost tab 502-1. The content of the suggestions window 504 is adapted to the customer's speech. For example, in the illustrated example, the customer speech includes "my phone's battery is dying too quickly." In response to that speech, the suggestions window 504 slides up from the bottom of the dynamic desktop 500-A and displays relevant selectable content items including articles regarding battery exchange procedures, a memo that contains the transcript of the caller's previous call, and information regarding battery life troubleshooting. The content items can include associated tags 508 that can be selected by the agent to indicate the usefulness or relevance of the content, which can be used later to train the suggestions engine.

In 416, the system generates additional control signals based on search results of subsequent segments of the live audio dialogue. The system can periodically or continuously query the database(s) for speech features that are extracted from respective segments of the live audio dialogue. For example, the system can continuously query the database(s) for speech features that are extracted continuously from the live audio dialogue as it develops spontaneously. As such, the system can continuously generate control signals based on search results that are continuously collected.

In 418, the system dynamically adapts the desktop in accordance with the additional control signals. For example, the desktop can adapt to the live audio dialogue by adding or removing tabs, rearranging the order of the tabs, or changing the content of the tabs. In one example, the system can move content the frontmost tab behind content of another tab, replace one tab without changing the frontmost tab, or adapt content of the tabs. For example, FIG. 5B illustrates another screen view of the dynamic desktop 500-B for the customer service agent. As shown, the tabs 502-1, 502-4, and 502-2 have been reordered and the tab 502-3—has been replaced by tab 502-6. Moreover, tab 502-4 is selected for display of its content on a display device.

The system can include a combination of various additional features. For example, the system can collect input parameters indicative of an interaction by the agent with the desktop. The system can generate a feedback signal based on the input parameters to update the search engine that outputs search results based on speech features. Hence, the search engine is biased based on the feedback signal. In another example, the system can generate a memo of the audio dialogue between the customer and the agent and generate a feedback signal based on content of the memo. The search results that are generated in real-time during the audio dialogue between the customer and the agent can be weighted based on the content of the memo.

CONCLUSION

Figure 6:
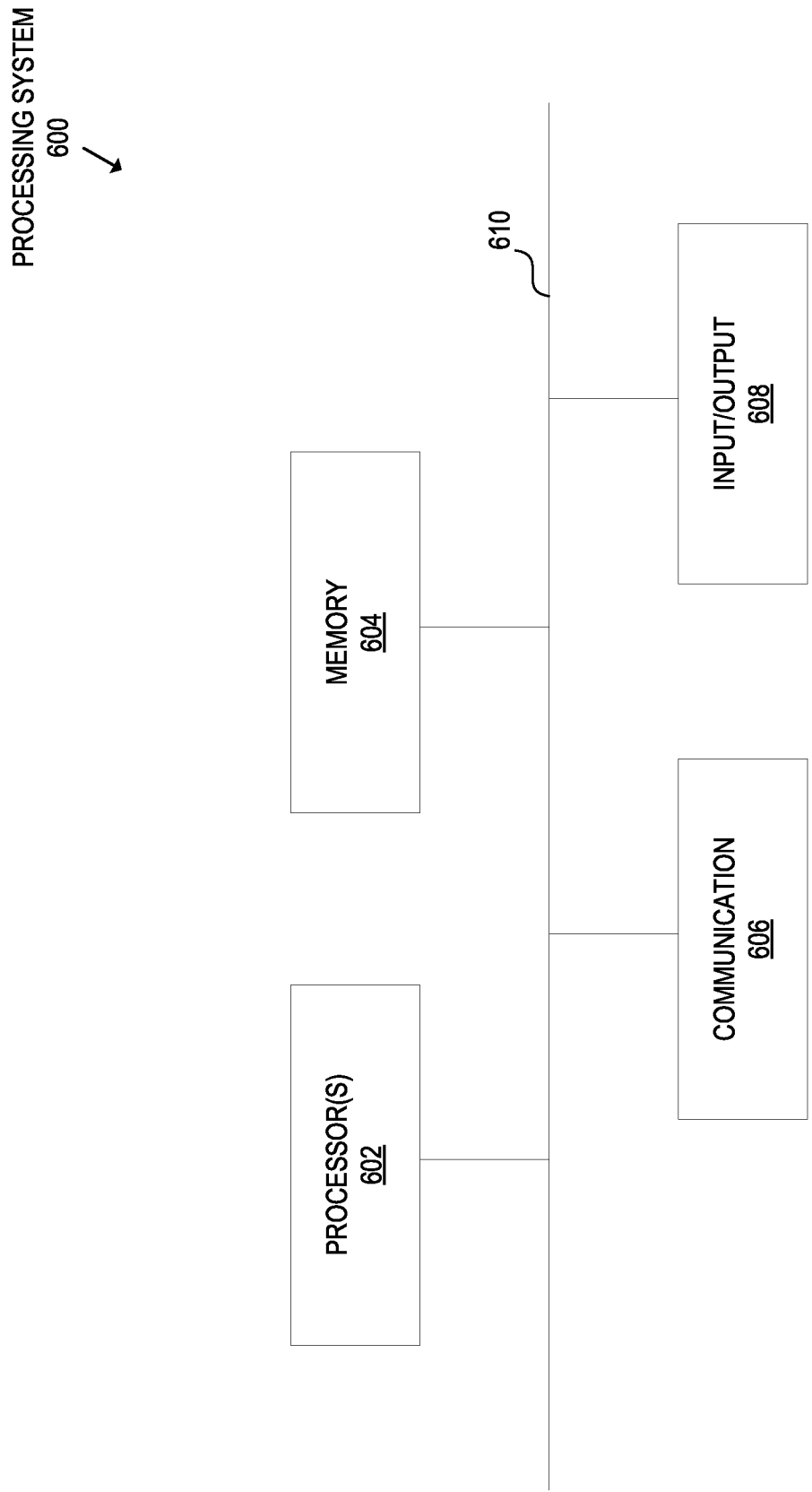
FIG. 6 is a block diagram that illustrates an example processing system in which aspects of the disclosed technology can be embodied.

FIG. 6 is a block diagram illustrating an example of a processing system 600 in which at least some operations described herein can be implemented. The processing system 600 represents a system that can run any of the methods/algorithms described herein. For example, system 200 or any of its components can include or be part of a processing system 600. The processing system 600 can include one or more processing devices, which can be coupled to each other via a network or multiple networks. A network can be referred to as a communication network or telecommunications network.

In the illustrated implementation, the processing system 600 includes one or more processors 602, memory 604, a communication device 606, and one or more input/output (I/O) devices 608, all coupled to each other through an interconnect 610. The interconnect 610 can be or include one or more conductive traces, buses, point-to-point connections, controllers, adapters and/or other conventional connection devices. Each of the processor(s) 602 can be or include, for example, one or more general-purpose programmable microprocessors or microprocessor cores, microcontrollers, application specific integrated circuits (ASICs), programmable gate arrays, or the like, or a combination of such devices.

The processor(s) 602 control the overall operation of the processing system 600. Memory 604 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 604 can store data and instructions that configure the processor(s) 602 to execute operations in accordance with the techniques described above. The communication device 606 can be or include, for example, an Ethernet adapter, cable modem, Wi-Fi adapter, cellular transceiver, Bluetooth transceiver, or the like, or a combination thereof. Depending on the specific nature and purpose of the processing system 600, the I/O devices 608 can include devices such as a display (which can be a touch screen display), audio speaker, keyboard, mouse or other pointing device, microphone, camera, etc.

While processes or blocks are presented in a given order, alternative implementations can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks can instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the implementations described above can be combined with each other, except to the extent that it can be stated otherwise above, or to the extent that any such implementations might be mutually exclusive in function and/or structure. Although the invention has been described with reference to specific implementations, it will be recognized that the invention is not limited to the implementations described but can be practiced with modification and alteration within the spirit and scope of the disclosed implementations. Accordingly, the specification and drawings are to be regarded in an illustrative sense rather than a restrictive sense.

Physical and functional components (e.g., devices, engines, modules, and data repositories) associated with processing system 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some implementations, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some implementations, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some implementations, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed implementations can be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further any specific numbers noted herein are only examples: alternative implementations can employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various implementations described above can be combined to provide further embodiments.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

I claim:

1. A method performed by a system to dynamically adapt a user interface (UI) to an ongoing audio dialogue between a customer and a customer service agent, the method comprising:

causing a speech feature analyzer to process a current portion of the ongoing audio dialogue with a prediction model to produce an output including multiple keywords,
wherein the multiple keywords indicate substance and meaning of the current portion of the ongoing audio dialogue;

querying a database for search results including content that is relevant to the multiple keywords,
wherein the search results are weighted based on demographic and historical information about the customer and actions performed by the agent on the UI while engaged in the ongoing audio dialogue with the customer;

generating a control signal based on the search results to control the content and placement of the content displayed on the UI to the ongoing audio dialogue;

causing an application programming interface (API) to configure the UI to the ongoing audio dialogue based on the control signals;
wherein the UI is adapted to arrange the content and the placement of the content displayed on the UI; and
dynamically adapting the UI in accordance with new control signals that are generated based on a subsequent portion of the ongoing audio dialogue between the customer and the agent.

2. The method of claim 1 further comprising:
continuously generating a transcription of the ongoing audio dialogue;
generating a weighted feedback signal based on the transcription; and
causing the prediction model to train based on the weighted feedback signal.

3. The method of claim 1 further comprising:
generating an indication of the customer's sentiment based on the ongoing audio dialogue;
generating a weighted feedback signal based on the indication; and
causing the prediction model to train based on the weighted feedback signal.

4. The method of claim 1, wherein:
the search results include an alert associated with the customer's mobile phone, and
a type or model of the customer's mobile phone is indicated by the multiple keywords.

5. The method of claim 1, wherein:
at least one keyword of the multiple keywords is labeled based on a characteristic of the at least one keyword, the labeling effective to associate the at least one keyword to a label; and
the at least one keyword is weighted based on the label.

6. The method of claim 5, wherein:
the at least one keyword is labeled as a telecommunications term; and
the at least one keyword is weighted higher than other keywords of the multiple keywords based on being labeled as a telecommunications term.

7. The method of claim 5, wherein:
a first keyword is labeled as customer speech;
a second keyword is labeled as agent speech; and
the first keyword is weighted higher than the second keyword based on the first keyword being labeled as customer speech.

8. A system configured to dynamically adapt a user interface (UI) to an ongoing audio dialogue between a customer and a customer service agent, the system comprising:
one or more processors; and
a memory coupled to the one or more processors, wherein the memory includes instructions which, when executed by the one or more processors, cause the system to:
cause a speech feature analyzer to process a current portion of the ongoing audio dialogue with a prediction model to produce an output including multiple keywords,
wherein the multiple keywords indicate substance and meaning of the current portion of the ongoing audio dialogue;
query a database for search results including content that is relevant to the multiple keywords,
wherein the search results are weighted based on demographic and historical information about the customer and actions performed by the agent on the UI while engaged in the ongoing audio dialogue with the customer;
generate a control signal based on the search results to control the content and placement of the content displayed on the UI to the ongoing audio dialogue;
cause an application programming interface (API) to configure the UI to the ongoing audio dialogue based on the control signals;
wherein the UI is adapted to arrange the content and the placement of the content displayed on the UI; and
dynamically adapt the UI in accordance with new control signals that are generated based on a subsequent portion of the ongoing audio dialogue between the customer and the agent.

9. The system of claim 8 being further caused to:
continuously generate a transcription of the ongoing audio dialogue;
generate a weighted feedback signal based on the transcription; and
cause the prediction model to train based on the weighted feedback signal.

10. The system of claim 8 being further caused to:
generate an indication of the customer's sentiment based on the ongoing audio dialogue;
generate a weighted feedback signal based on the indication; and
cause the prediction model to train based on the weighted feedback signal.

11. The system of claim 8, wherein:
the search results include an alert associated with the customer's mobile phone, and
a type or model of the customer's mobile phone is indicated by the multiple keywords.

12. The system of claim 8, wherein:
at least one keyword of the multiple keywords is labeled based on a characteristic of the at least one keyword, the labeling effective to associate the at least one keyword to a label; and
the at least one keyword is weighted based on the label.

13. The system of claim 8, wherein:
at least one keyword of the multiple keywords is labeled as a telecommunications term; and
the at least one keyword is weighted higher than other keywords of the multiple keywords based on being labeled as a telecommunications term.

14. The system of claim 8, wherein:
a first keyword is labeled as customer speech;
a second keyword is labeled as agent speech; and
the first keyword is weighted higher than the second keyword based on the first keyword being labeled as customer speech.

15. At least one non-transitory, computer-readable medium, carrying instructions that, when executed by at least one processor, performs a method to dynamically adapt a user interface (UI) to an ongoing audio dialogue between a customer and a customer service agent, the method comprising:
causing a speech feature analyzer to process a current portion of the ongoing audio dialogue with a prediction model to produce an output including multiple keywords;
querying a database for search results including content that is relevant to the multiple keywords,
wherein the search results are weighted based on information about the customer or actions performed by the agent on a UI while engaged in the ongoing audio dialogue with the customer;

generating a control signal based on the search results to control the content displayed on the UI to the ongoing audio dialogue;

causing an application programming interface (API) to configure the UI to the ongoing audio dialogue based on the control signals;

wherein the UI is adapted to arrange the content displayed on the UI; and dynamically adapting the UI in accordance with new control signals that are generated based on a subsequent portion of the ongoing audio dialogue between the customer and the agent.

16. The non-transitory, computer-readable medium of claim 15, wherein the method further comprises:

continuously generating a transcription of the ongoing audio dialogue;

generating a weighted feedback signal based on the transcription; and causing the prediction model to train based on the weighted feedback signal.

17. The non-transitory, computer-readable medium of claim 15, wherein the method further comprises:

generating an indication of the customer's sentiment based on the ongoing audio dialogue;

generating a weighted feedback signal based on the indication; and causing the prediction model to train based on the weighted feedback signal.

18. The non-transitory, computer-readable medium of claim 15, wherein the search results include an alert associated with the customer's mobile phone, and wherein a type or model of the customer's mobile phone is indicated by the multiple keywords.

19. The non-transitory, computer-readable medium of claim 15, wherein:

at least one keyword of the multiple keywords is labeled based on a characteristic of the at least one keyword, the labeling effective to associate the at least one keyword to a label; and the at least one keyword is weighted based on the label.

20. The non-transitory, computer-readable medium of claim 15, wherein the control signal is effective to cause the API to configure the UI to only display search results that are weighted above a threshold.

* * * * *